United States Patent [19]

Warren, Jr. et al.

[11] Patent Number: 5,635,086

[45] Date of Patent: Jun. 3, 1997

[54] LASER-PLASMA ARC METAL CUTTING APPARATUS

[75] Inventors: Joseph V. Warren, Jr.; Chester E. Stanley, both of Florence, S.C.

[73] Assignee: The Esab Group, Inc., Florence, S.C.

[21] Appl. No.: 541,956

[22] Filed: Oct. 10, 1995

[51] Int. Cl.$^6$ .............................. B23K 10/00; B23K 26/00
[52] U.S. Cl. ................... 219/121.39; 219/121.67; 219/121.58; 219/121.78
[58] Field of Search ............. 219/121.39, 121.44, 219/121.48, 121.58, 121.63, 121.67, 121.76, 121.77, 121.78

[56] References Cited

U.S. PATENT DOCUMENTS

| | | |
|---|---|---|
| 3,950,189 | 4/1976 | Lange et al. . |
| 4,689,467 | 8/1987 | Inoue .................. 219/121.63 |
| 4,940,879 | 7/1990 | De-Swaan . |
| 4,973,819 | 11/1990 | Thatcher ............... 219/121.78 |
| 4,988,845 | 1/1991 | Bauer et al. ............ 219/121.63 |
| 5,229,571 | 7/1993 | Neiheisel .............. 219/121.63 |
| 5,262,612 | 11/1993 | Momany et al. ........ 219/121.67 |
| 5,350,897 | 9/1994 | Chun .................... 219/121.39 |
| 5,380,976 | 1/1995 | Couch, Jr. et al. . |
| 5,481,083 | 1/1996 | Smyth, Jr. ............. 219/121.67 |

*Primary Examiner*—Mark H. Paschall
*Attorney, Agent, or Firm*—Bell, Seltzer, Park & Gibson, P.A.

[57] ABSTRACT

A metal cutting apparatus which comprises a longitudinally moveable gantry and a transversely moveable carriage which is mounted on the gantry. The carriage in turn mounts a laser cutting head and a plasma arc cutting head mounted in a parallel, side-by-side arrangement. The apparatus may thus be programmed to operate either the laser cutting head or the plasma arc cutting head as the gantry and carriage move in a predetermined path above the underlying workpiece. The laser generator is mounted in the gantry so that the beam is transported to the laser head with minimal bends and turns. The apparatus may also include a second carriage, which mounts a second laser cutting head and second plasma arc cutting head, so as to permit simultaneous cutting along two cut lines.

10 Claims, 3 Drawing Sheets

LASER-PLASMA ARC METAL CUTTING APPARATUS

BACKGROUND OF THE INVENTION

The present invention relates to an apparatus for cutting metal workpieces, particularly metal plates.

Metal cutting machines which employ a laser cutting head are known, wherein the laser cutting head is mounted on a moveable gantry, and so that the laser cutting head may be moved in a predetermined path of travel to cut a sheet metal plate or other product positioned on a table underlying the gantry. Such laser cutting machines are capable of producing very accurate cuts in relatively thin sheet metal plates, at rapid production speeds, but in the case of more thick plates, the production speed is significantly reduced. Also, such laser cutters require a relatively complex system of mirrors and lenses, commonly referred to as "flying optics" to transport the beam from a beam generator to the workpiece, and these mirrors and lenses require constant adjustment and maintenance to keep them performing satisfactorily. In this regard, a slight misalignment of the beam can result in a deterioration of the cut quality. Also, in cases where the required laser beam generator is mounted off the gantry because of its physical size, the complexity of the flying optic system is exacerbated.

A further limitation of the known laser cutting machines is the fact that such machines are not able to readily cut thick metal plates, and they have difficulty cutting reflective metals, such as aluminum.

To alleviate the above-noted limitations and disadvantages of the prior laser cutting machines, U.S. Pat. No. 5,350,879 to Chun suggests a hybrid cutting apparatus which has a laser beam cutting head and a plasma arc cutting head mounted side-by-side on a shuttle carrier plate which may be selectively moved to a single fixed cutting station. The workpiece is mounted on a moveable work table so as to permit contoured cutting of the moving workpiece, either by the laser cutting head or the plasma arc cutting head. Cutting in the plasma arc mode thus permits the efficient cutting of relatively thick workpieces, and provides a degree of flexibility in the types of cutting which can be performed. However, the Chun apparatus requires the workpiece to be moved under the laser or plasma head, which limits the size, thickness, and weight of the workpiece which can be handled.

It is an object of the present invention to provide an improved metal cutting apparatus having a laser beam cutting head and of the type employing both a laser cutting head and a plasma arc cutting head.

It is a more particular object of the present invention to provide a metal cutting apparatus having a laser beam cutting head and which is able to handle large and heavy workpieces, and wherein a highly simplified transport system for transporting the laser beam from the generator to the workpiece is provided.

It is another object of the present invention to provide a metal cutting apparatus having the capability to cut with either a laser beam or a plasma arc, and which is capable of cutting at two locations simultaneously, in separately controllable patterns. Thus, for example, the apparatus can cut two like patterns, or two mirror image patterns.

These and other objects and advantages of the present invention are achieved by the provision of a metal cutting apparatus which comprises a table for supporting a workpiece in a fixed location, and a gantry mounted for back and forth movement across the table in a longitudinal direction. A carriage is mounted to the gantry for back and forth movement across the table in a transverse direction, and a laser cutting head and a plasma arc cutting head are each mounted to the carriage in a side-by-side, parallel relationship. A laser beam generator is mounted on the gantry and a beam transport system is provided for transporting the beam from the generator to the laser cutting head so as to operate the cutting head. Also, a plasma control module is provided for operating the plasma arc cutting head, and the module is operatively connected to the plasma arc cutting head so as to operate the same. A controller is provided for selectively moving the gantry in the longitudinal direction and selectively moving the carriage in the transverse direction, while operating either the laser cutting head or the plasma arc cutting head, so as to cut a workpiece positioned on the table along a predetermined pattern.

In the preferred embodiment, the gantry comprises a pair of transversely separated housings, with a support beam extending transversely therebetween. Also, the laser beam generator is mounted in one of the housings, so that the beam transporting system transports the beam essentially directly in the transverse direction to the laser cutting head. Also in the preferred embodiment, the plasma control module is positioned in one of the housings of the gantry, so as to facilitate its connection to the plasma arc cutting head via a flexible bundle of lines.

In a second embodiment of the invention, the apparatus comprises a second carriage mounted for transverse movement along the support beam, and a second laser cutting head and a second plasma arc cutting head are mounted to the second carriage in a side-by-side relationship. A second laser beam generator and a second plasma control module are mounted to the other housing of the gantry in a manner corresponding to that of the first above-described cutting system. The provision of a second cutting system thus provides the apparatus with the ability to simultaneously cut the workpiece at two locations, in separately controllable patterns, thus increasing the productivity of the apparatus.

BRIEF DESCRIPTION OF THE DRAWINGS

Some of the objects and advantages of the present invention having been stated, others will appear as the description proceeds, when taken in conjunction with the accompanying drawings, in which.

DETAILED DESCRIPTION OF THE PREFERRED EMBODIMENTS

Figure 1:
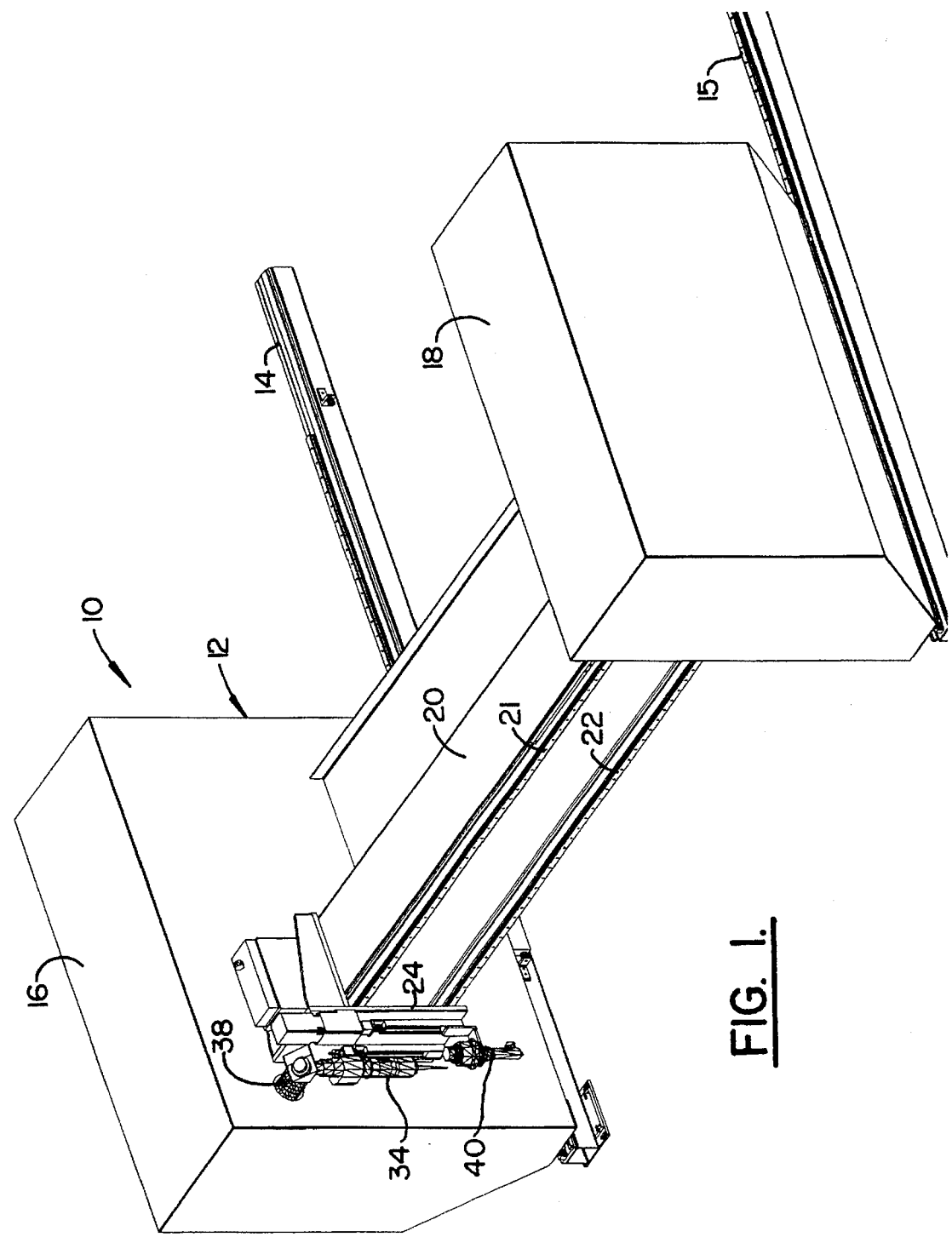
FIG. 1 is a perspective view of a metal cutting apparatus which embodies the present invention.
Figure 2:
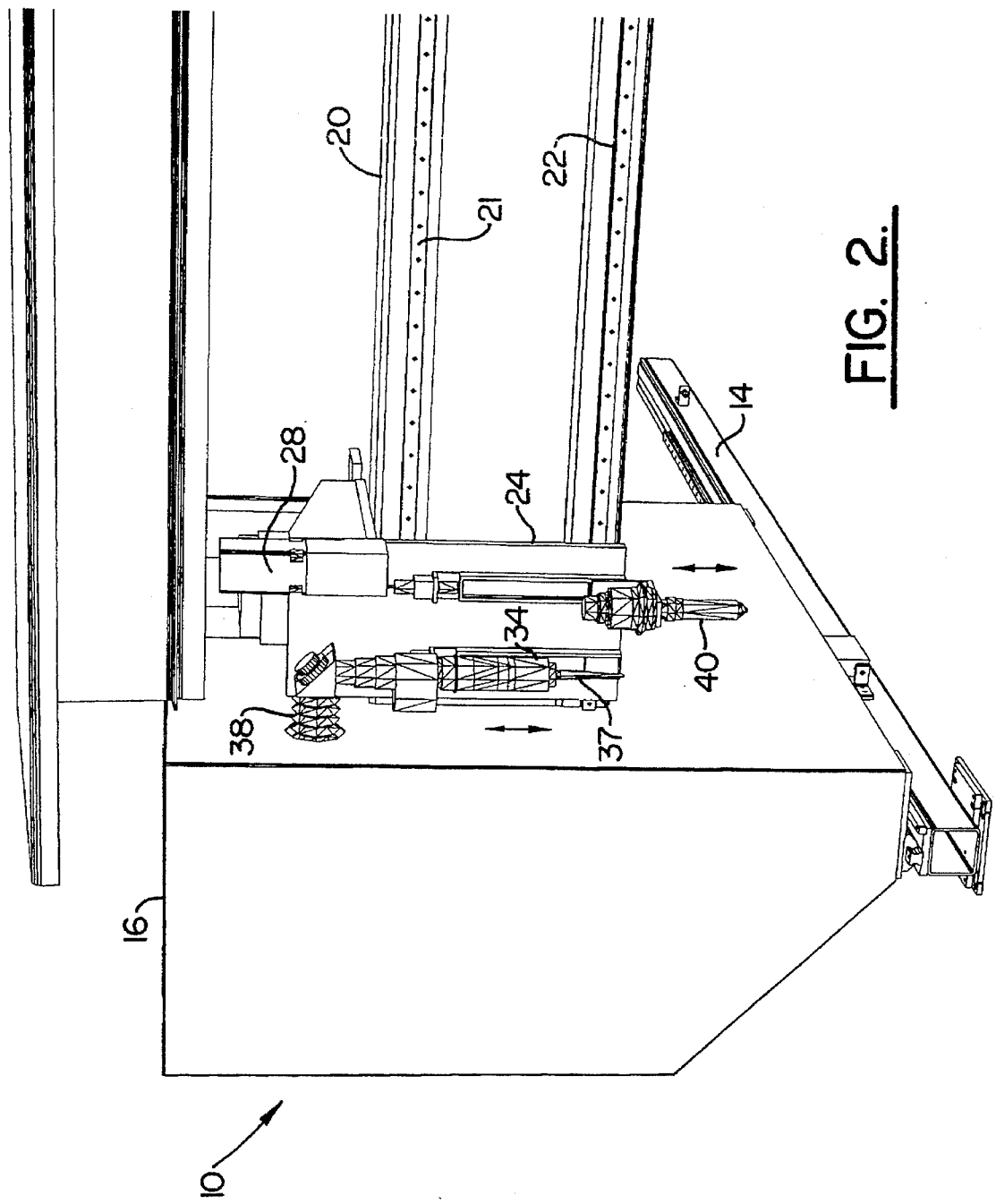
FIG. 2 is a fragmentary perspective view illustrating one of the housings of the gantry of the apparatus shown in FIG. 1, together with the moveable carriage and cutting heads.
Figure 3:
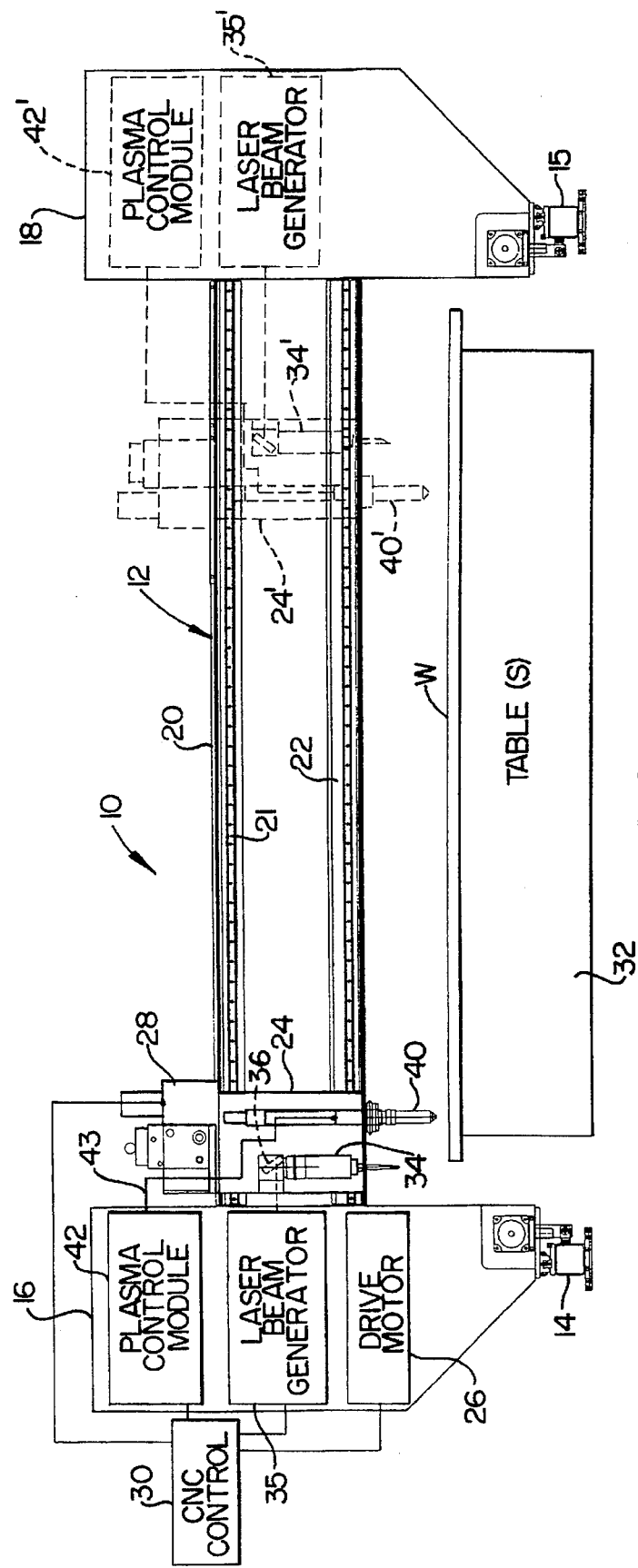
FIG. 3 is a partly schematic front elevation view of the apparatus of the present invention and illustrating in dashed lines the embodiment having a second carriage and second cutting heads.

Referring more particularly to the drawings, FIGS. 1–3 illustrate a metal cutting apparatus at 10, which embodies the present invention and which comprises a gantry 12 which is mounted upon a pair of rails 14, 15 for back and forth movement in a longitudinal direction, i.e. a direction parallel to the rails.

The gantry 12 comprises a pair of transversely separated housings 16, 18, and a support beam 20 extending transversely therebetween. The beam 20 mounts a pair of rails 21, 22 which extend transversely along the front face of the beam 20, and the rails 21, 22 in turn mount a vertically disposed carriage 24 thereupon, so that the carriage 24 is able to slide transversely along the front face of the beam 20.

A conventional, drive motor 26 (FIG. 3) is provided in one or both of the housings 16, 18 for positively moving the gantry in each direction along the rails 14, 15, and a further drive motor 28 is mounted on the carriage 24 for positively moving the carriage in each transverse direction. The motors 26, 28 are under the control of a computer numeric controlled (CNC) controller 30, as is illustrated schematically in FIG. 3.

The apparatus 10 of the present invention also includes a table 32 (note FIG. 3) for supporting a workpiece W in a fixed location, with the table 32 being bolted to the floor and positioned so as to underlie the support beam 20 as it moves longitudinally back and forth with the gantry 12.

In accordance with the present invention, a laser cutting head 34 is mounted on the front surface of the carriage 24 so as to be disposed in a vertical, downwardly directed orientation. A laser beam generator 35 is mounted in the housing 16, with the generator being oriented so as to direct the beam therefrom in an initial direction which is parallel to the direction of the rails 14, 15. A first mirror (not shown) is mounted in the housing 16 so as to deflect the beam by 90° and thus direct the beam in a transverse direction and to a second mirror 36 which is mounted immediately above the laser cutting head 34. The laser cutting head 34 includes a suitable lens and also an assist gas nozzle 37, both of conventional design, for focusing the beam downwardly to the underlying workpiece. An assist gas is delivered to the nozzle 37 by means of a flexible tube (not shown) which is connected to the head 34 in a conventional manner.

A suitable laser beam generator for use with the present invention is manufactured by Rofin-Sinar Laser GmbH, of Hamburg, Germany as model number DC020. With the Rofin-Sinar laser generator, the lasing gases are provided by means of a pre-mix cylinder, which may be easily installed in the housing of the gantry. The gas is recycled through the laser, thus eliminating the need for replacement cylinders.

The positioning of the generator 35 in the housing 16 of the gantry 12 in the above-described manner will be seen to provide a simplified and reliable system for transporting the beam to the laser cutting head as the head 34 is moved transversely with the carriage 24. The optics are essentially confined to the transverse directions, and bends and turns, which result in alignment difficulty, are minimized. Also, as is conventional, the laser beam is enclosed within a pressurized, extensible cover 38 (FIGS. 1 and 2) for safety purposes.

The apparatus 10 of the present invention also includes a plasma arc cutting head 40 which is mounted on the carriage 24 in a parallel, side-by-side arrangement with the laser cutting head 34. The plasma cutting head 40 is of conventional design and may, for example, comprise model number PT-15 manufactured by ESAB Group, Inc. of Florence, S.C. This particular plasma cutting head is operated in the transfer arc mode, wherein an electrical arc extends from an electrode in the head to the workpiece, and with the arc being stabilized by means of a plasma gas, such as nitrogen or oxygen.

A plasma control module 42 is mounted in the housing 16, which comprises a conventional electric power supply and a gas supply line, and other controls which are normally associated with a plasma arc cutting head, such as flow controls, pressure sensors, and a programmed logic computer. The power and gas are delivered from the module 42 to the plasma arc cutting head 40 via flexible cables or hoses as indicated schematically at 43 in FIG. 3.

The laser cutting head 34 and the plasma arc cutting head 40 are preferably each mounted for independent vertical height adjustment as indicated schematically by the arrows in FIG. 2, with the vertical positioning of each head being controlled by a height control system of known design. The height control permits the apparatus 10 to accommodate workpieces W of different thicknesses, and also automatically adjusts for warpage of the workpiece during the cutting operation. The height control also permits the laser cutting head 34 to be upwardly withdrawn during operation of the plasma arc cutting head 40 as is illustrated in the drawings, so as to avoid damage to the laser cutting head from flying debris.

The controller 30 for the gantry 12 also includes suitable controls for separately operating either the laser cutting head 34 or the plasma arc cutting head 40, while selectively moving the gantry longitudinally along the rails 14, 15, and also selectively moving the carriage transversely along the support beam 20. Thus a workpiece W positioned on the table 32 may be cut in a predetermined two dimensional pattern.

FIG. 3 also illustrates a second embodiment of the apparatus in dashed lines. In particular, the rails 21, 22 of the support beam 20 mount a second carriage 24', which in turn mounts a second laser cutting head 34' and a second plasma cutting head 40'. Also, a second laser beam generator 35' and a second plasma control module 42' are mounted in the housing 18. The second components may structurally conform to the above-described corresponding components, and this second cutting system provides the ability to concurrently cut the workpiece W in two separately controllable patterns. For example, the two cutting patterns could be the same, or they could be mirror images of each other.

With the second carriage 24' as described above, the apparatus 10 is able to cut two plates of different thickness or types of material concurrently. Such operation may be achieved by independently varying the laser current to the two heads 34 and 34' by means of the CNC controller 30, while maintaining the same speed and same geometry of the cut.

It is also possible to split the laser beam generated by the laser beam generator 35 in the housing 16, using conventional beam splitting techniques, such that the two beams could be delivered to respective ones of the heads 34 and 34', thereby eliminating the second laser beam generator 35'. This construction would of course reduce the power available for each of the heads 34 and 34', but it would significantly reduce the cost of the apparatus and would be suitable for many applications.

It is also contemplated that the gantry 12 could be positioned so as to be selectively movable over dual or triple tables 32 which are positioned in tandem along a line extending between and parallel to the two rails 14, 15. Thus while the machine is cutting parts on one table, parts that have already been cut on a second table can be unloaded by the operator. Where a third table is employed, a new plate can be loaded on the third table while the cutting and unloading operations are taking place. Thus production capacity may be significantly increased.

In the drawings and the specification, there has been set forth a preferred embodiment of the invention, and although specific terms are employed, they are used in a generic and descriptive sense only and not for purposes of limitation, the scope of the invention being defined in the claims.

That which is claimed is:

1. An apparatus for cutting metal workpieces comprising
   at least one table for supporting a workpiece in a fixed location,
   a gantry mounted for back and forth movement across the one table in a longitudinal direction, said gantry comprising a pair of transversely separated housings and a support beam extending transversely therebetween,
   a carriage mounted to said support beam for back and forth movement across the one table in a transverse direction,
   a laser cutting head and a plasma arc cutting head each mounted to said carriage in a side by side relationship,
   a laser beam generator mounted to one of said housings of said gantry and means for transporting the generated beam to said laser cutting head so as to operate the laser cutting head,
   a plasma control module and means operatively connecting the plasma control module to said plasma arc cutting head so as to operate the plasma arc cutting head, and
   control means for selectively moving the gantry in the longitudinal direction and selectively moving the carriage in the transverse direction, while operating either the laser cutting head or the plasma arc cutting head, so as to cut a workpiece positioned on said one table.

2. The apparatus as defined in claim 1 wherein said plasma control module is mounted to said one of said housings of said gantry.

3. The apparatus as defined in claim 2 further comprising
   a second carriage mounted to said beam for back and forth movement across the one table in a transverse direction, and
   a second laser cutting head and a second plasma arc cutting head each mounted to said second carriage in a side by side relationship.

4. The apparatus as defined in claim 3 further comprising
   a second laser beam generator mounted to the other of said housings of said gantry and means for transporting the beam generated by said second laser beam generator to said second laser cutting head so as to operate the second laser cutting head,
   a second plasma control module mounted to said other housing of said gantry and means operatively connecting the second plasma control module to said second plasma arc cutting head so as to operate the second plasma arc cutting head, and
   wherein said control means further includes means for selectively operating either the second laser cutting head or the second plasma arc cutting head, so as to cut a workpiece positioned on said one table.

5. The apparatus as defined in claim 4 wherein the first and second plasma control modules each comprise an electrical power supply line and a gas supply line for operating the associated plasma arc cutting head.

6. The apparatus as defined in claim 1 wherein said laser cutting head and said plasma arc cutting head are each mounted to said carriage so as to permit independent vertical adjustment thereof.

7. The apparatus as defined in claim 1 comprising a plurality of said tables arranged in tandem along a line extending parallel to said longitudinal direction.

8. An apparatus for cutting metal workpieces comprising
   at least one table for supporting a workpiece in a fixed location,
   a gantry mounted for back and forth movement across the one table in a longitudinal direction, said gantry comprising a pair of transversely separated housings and a support beam extending transversely therebetween,
   a first carriage mounted to said support beam for back and forth movement across the one table in a transverse direction,
   a second carriage mounted to said support beam for back and forth movement across the one table in the transverse direction,
   a first laser cutting head mounted to said first carriage,
   a second laser cutting head mounted to said second carriage,
   a first laser beam generator mounted to one of said housings of said gantry and means for transporting the generated beam to said first laser cutting head so as to operate the first laser cutting head,
   a second laser beam generator mounted to the other of said housings of said gantry and means for transporting the beam generated by said second laser beam generator to said second laser cutting head so as to operate the second laser cutting head, and
   control means for selectively moving the gantry in the longitudinal direction and selectively moving each of the first and second carriages in the transverse direction, while selectively operating either one or both of the first and second laser cutting heads so as to cut a workpiece positioned on said one table.

9. The apparatus as defined in claim 8 further comprising
   a first plasma arc cutting head mounted to said first carriage in a side by side arrangement with said first laser cutting head,
   a second plasma arc cutting head mounted to said second carriage in a side by side arrangement with said second laser cutting head,
   a first plasma control module mounted to said one housing of said gantry and means operatively connecting the first plasma control module to said first plasma arc cutting head so as to operate the first plasma arc cutting head,
   a second plasma control module mounted to said other housing of said gantry and means operatively connecting the second plasma control module to said second plasma arc cutting head so as to operate the second plasma arc cutting head, and
   wherein said control means further includes means for selectively operating either one or both of the first and second plasma arc cutting heads.

10. The apparatus as defined in claim 9 wherein each of said first and second laser cutting heads and each of said first and second plasma arc cutting heads are mounted to their respective carriages so as to permit independent vertical adjustment thereof.

* * * * *